Figure 3:
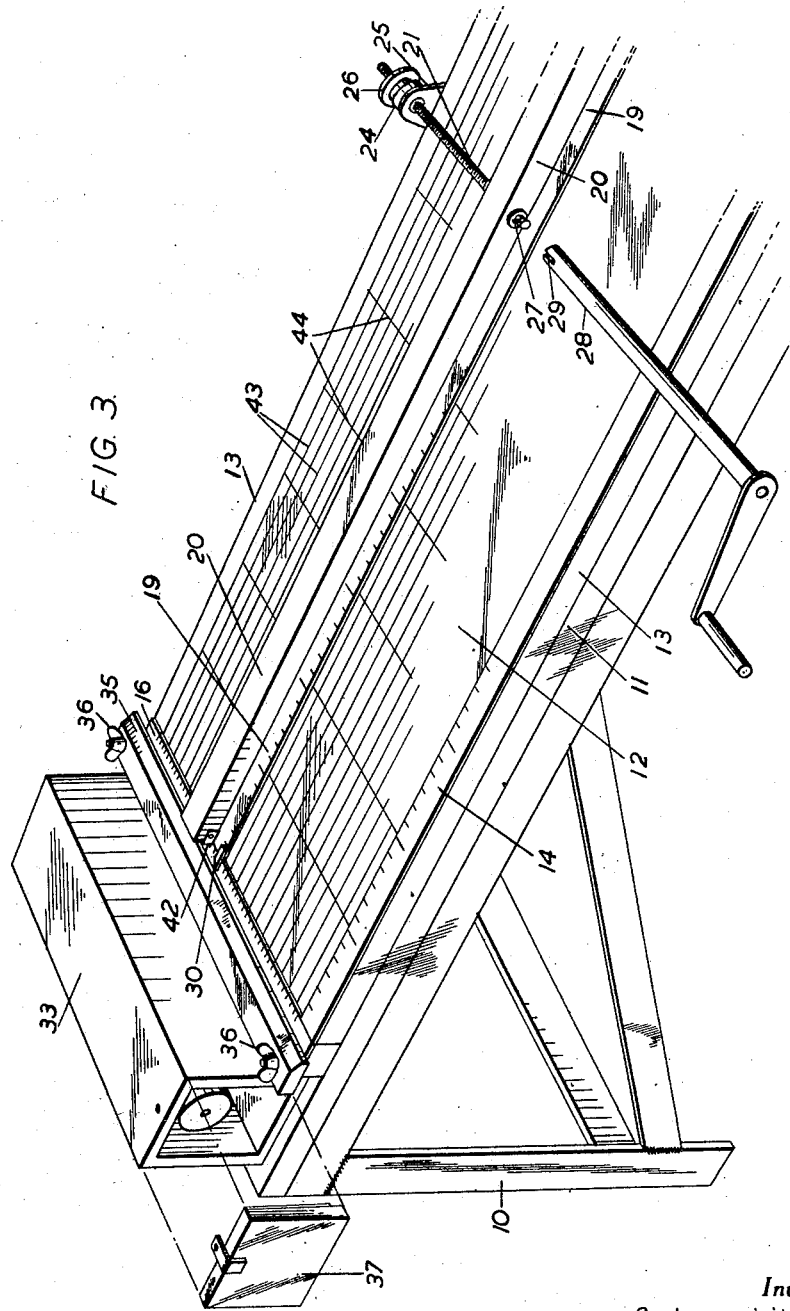

July 15, 1958
S. LITTMAN
2,842,772
MANUFACTURE OF GARMENTS OR ARTICLES
FROM SHEET MATERIAL
Filed Jan. 18, 1954
3 Sheets-Sheet 1
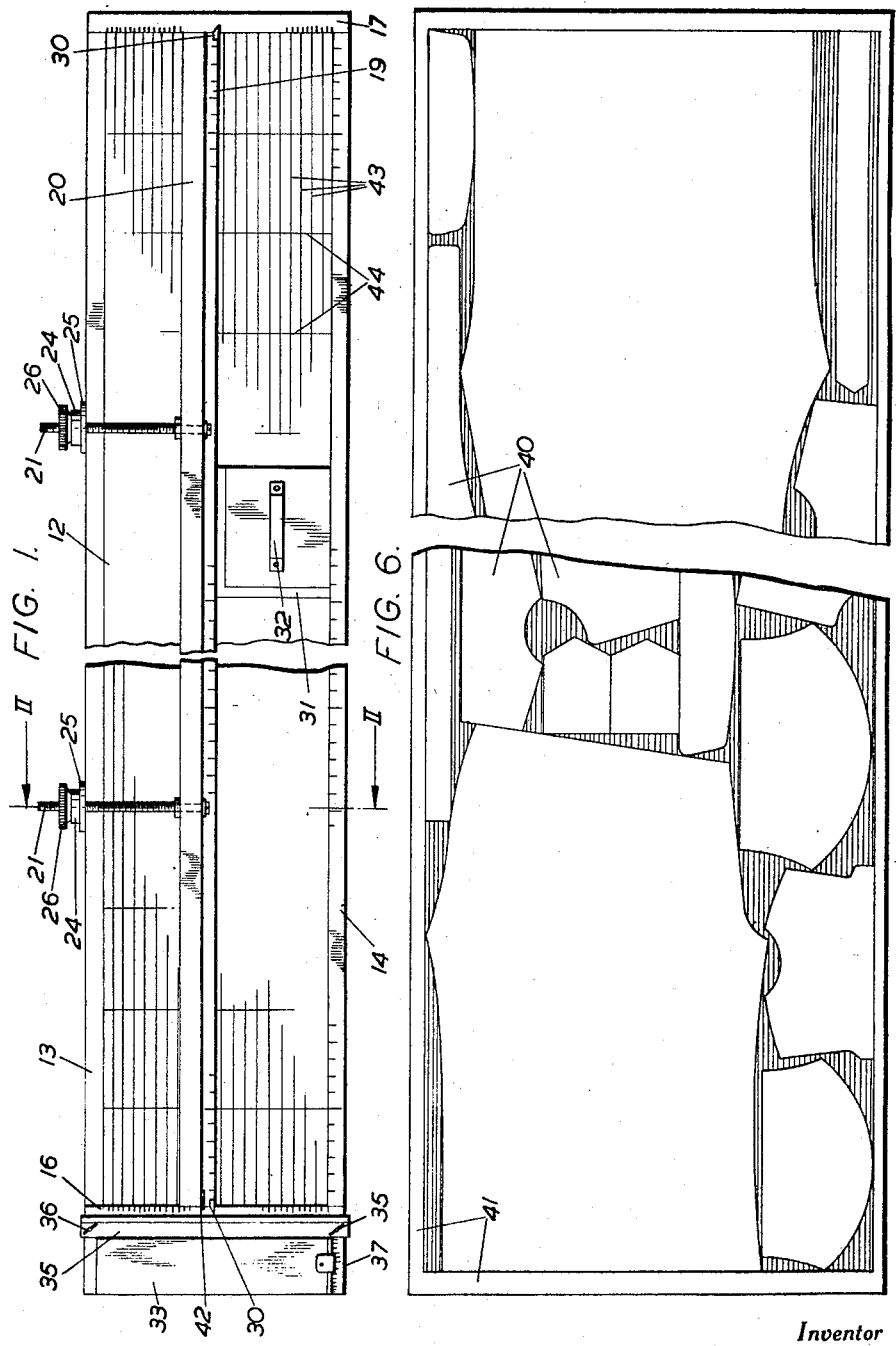
Inventor
Sydney Littman
By
Holcombe, Wetherill + Brisebois   Attorneys July 15, 1958     S. LITTMAN     2,842,772
MANUFACTURE OF GARMENTS OR ARTICLES
FROM SHEET MATERIAL
Filed Jan. 18, 1954     3 Sheets-Sheet 2
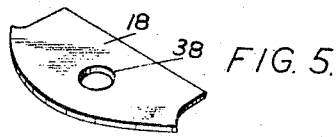
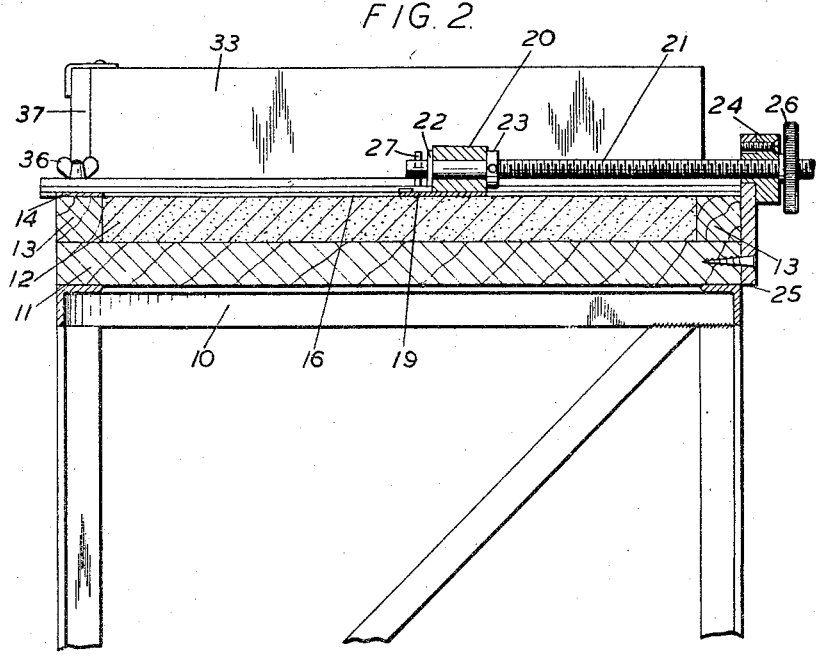
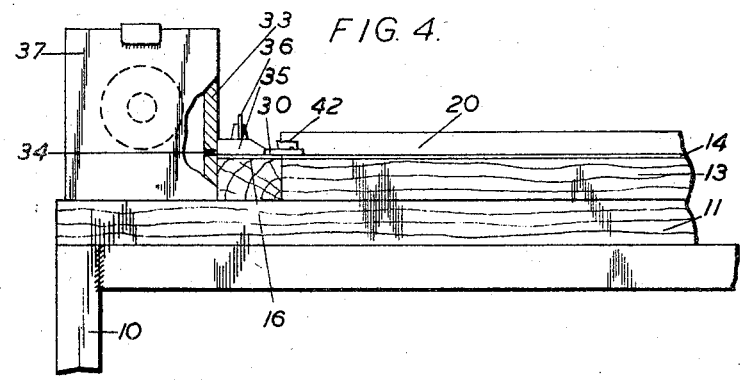
*Inventor*
Sydney Littman
By
Holcombe, Wetherill + Brisebois *Attorneys*

July 15, 1958

S. LITTMAN 2,842,772

MANUFACTURE OF GARMENTS OR ARTICLES
FROM SHEET MATERIAL

Filed Jan. 18, 1954

3 Sheets-Sheet 3

Inventor
Sydney Littman

By

Holcombe, Wetherill + Brisebois  Attorneys

United States Patent Office 2,842,772
Patented July 15, 1958

2,842,772

MANUFACTURE OF GARMENTS OR ARTICLES FROM SHEET MATERIAL

Sydney Littman, London, England

Application January 18, 1954, Serial No. 404,605

3 Claims. (Cl. 2—243)

In the manufacture of clothing and like articles from fabric or flexible sheets, a number of patterns, each representing one of the individual pieces which are to be stitched or otherwise connected together, are laid on the material prior to cutting out the material to the shapes of the several patterns. The patterns should be carefully arranged on the material so as to use a minimum amount of material for each article. This is not of very great importance when only a few articles are being made, but in quantity production, it is of extreme importance to avoid waste of material, as such waste is multiplied by the number of articles to be made.

The correct placing of the patterns on the material is a very difficult and tedious operation especially in cases where a large number of individual patterns are required for each article. For example, as many as twenty-five patterns may be required for a shirt, and to minimise waste an operator sometimes arranges four sets of patterns, representing four articles, on a single length of material. The arranging of these patterns, for example 100 patterns on a piece of material which may be up to 14 yards in length, is particularly difficult and tedious and consequently tiring to the operator which frequently results in inefficiency and incorrect placing of the patterns.

The arranging of patterns on material has to be done frequently, because for different sizes of the finished articles, a different arrangement of the patterns may be required, and also a different arrangement may be required when the shape of any one of the patterns is altered.

Whilst the invention is primarily intended for use in the manufacture of garments, it is equally well applicable for other purposes, and may be used where parts are to be cut out from any flexible or rigid sheet materials such as, for example, plywood, plastics materials, or sheet metal. Thus, the invention can be used in the manufacture of articles of furniture incorporating plywood, plastics or sheet metal, or in the manufacture of many other articles such as, for example, vehicle and aircraft bodies.

The present invention is designed to provide a convenient method for determining the arrangement of patterns on a sheet or strip of material, and for producing a record or chart of the arrangement for use when actually placing the patterns on the material.

The method according to the invention, comprises arranging reduced scale models of the patterns on a board or sheet representing on the same reduced scale the material from which a garment or other article is to be made, and then reproducing the arrangement of the scale models by photography or any other convenient method to provide a chart for use as a guide when placing the actual patterns on the material. The scale models of the patterns may be made in any convenient rigid material, for example, one of the rigid plastics materials, and may be cut out from a sheet of such material. The models must also be very accurate in size and shape and this may be determined by tracing from the actual patterns by means of a pantograph device. The word "rigid" is therefore used to indicate that the material will not deform under the normal conditions of use sufficiently to permit the models to be positioned on the board in an arrangement which cannot be duplicated by the full size patterns when laid absolutely flat on the material from which the garment is to be cut.

Rigid models can conveniently be arranged, moved, and re-arranged on the sheet or board until the most desirable arrangement is found, and to facilitate this, each model may have means for manipulating, for example projections on its surface, or holes, to enable the model to be gripped by tweezers or other holding devices.

It will be appreciated that by using scale models, the arrangement or layout for a large number of individual patterns can be seen in its entirety, whereas when arranging actual full scale patterns on a piece of material, which, as stated above, may be 14 yards long, it is difficult to visualise any substantial part of the arrangement or layout, and almost impossible to visualise the entire layout. The method according to the invention, therefore, very greatly simplifies the operation, and makes it possible to arrange sets of patterns in the most advantageous way whereby a saving in the material is effected. The saving of material may be only small for each garment or article, but for quantity production, such a small saving represents a substantial amount in a large batch of garments or articles. Furthermore, when the arrangement or layout has been determined, the chart produced therefrom can be used indefinitely, when cutting out any number of garments or articles, and after use can be filed away for future use.

In order that the invention may be clearly understood and readily carried into effect, apparatus for carrying out the method according to the invention will now be more fully described, by way of example only, with reference to the accompanying drawings in which:

Figure 1 is a plan view of the apparatus incorporating scales and slides and on which the models are to be arranged, Figure 2 is a sectional elevation on the line II—II of Figure 1 with the apparatus supported on a table, Figure 3 is a perspective view of one end portion of the apparatus shown in Figure 1, and its supporting table, Figure 4 is a front elevation partly in section, of one end portion of the apparatus, Figure 5 is a perspective view of one of the models, and Figure 6 is a view, partly broken away, of a chart made according to the invention.

Referring to the drawings, the apparatus may be supported on a table 10, as shown in Figures 2, 3 and 4, although any other convenient supporting structure may be used, or the supporting structure may be incorporated in the apparatus. The apparatus includes a base structure which can therefore be regarded as the equivalent of a table top, and in the particular construction illustrated, the base structure comprises a wooden base 11 on which a sheet or slab 12 of smooth surfaced material is mounted and surrounded by a wooden frame 13. The sheet or slab 12 may be of any suitable material, for example one of the plastics although material such as terazzo without surface chips has been found satisfactory. The wooden frame 13 is provided because it is convenient for the mounting of scales or the like, but in the case of the sheet 12 being a relatively thin sheet of, for example, synthetic resin material, the frame could be omitted and such a sheet could extend over the whole of the base 11 and scales could be mounted on the upper surface of the sheet by screws passed through the sheet into the base 11.

In this embodiment, a scale 14 is mounted on the front members of the frame 13, and scales 16 and 17 are mounted on the two end members respectively of the frame. As the upper surfaces of the frame 13 and the sheet or slab 12 lie in a common plane, the scales 14, 16 and 17 define a shallow recess in which scale models of patterns are to be manipulated. The thickness of the scale model patterns, an example of one 18 being shown in Figure 5, is the same as the thickness of the scales so that the upper surfaces of a series of models placed on the sheet or slab 12 will lie in the same plane as the upper surfaces of the scales.

The sheet or slab 12 is to serve as a background corresponding with the material from which the eventual garment or article is to be made, the means are provided for varying the effective width and length of such background.

For varying the width, an adjustable scale 19 is provided. This scale 19 rests on the sheet or slab 12 and extends between the two end scales 16 and 17, and it is of the same thickness as the scales 14, 16 and 17. A beam 20 is mounted on the scale 19, the calibrated front edge portion of the scale projecting beyond the front edge of the beam, see particularly Figures 2 and 3, and two screws 21 are provided for adjusting the beam 20 with its scale 19 towards and away from the scale 14. The front end portion of each screw 21 is plain and is rotatably mounted in a hole in the beam 20 but axial movement of the screw relatively to the beam is prevented by collars 22, 23 secured to the screw and engaging with the front and rear surfaces respectively of the beam, see Figure 2. Each screw 21 is engaged in a nut 24 rigidly mounted on one of a pair of brackets 25, 25 which are spaced apart and secured to the rear of the base structure so as to project upwardly therefrom. A lock nut 26 is threaded on each screw 21 for locking the latter after adjustment. The front of each screw 21 has a diametrical projecting pin 27 for engagement by a manipulating tool such as that shown at 28 in Figure 3 and having a slotted end 29 for engagement with the pin 27. It will be understood that the screws 21 may have any other convenient means whereby they can be rotated. Each end of the scale 19 carries a pointer 30 which overlies the adjacent scale 16 or 17 for co-operation with the calibrations on the scale 16 or 17 and to provide an indication of the setting of the scale 19.

For varying the effective length of the background represented by the sheet or slab 12, a plate 31 may be provided. This plate 31 is weighted so that it will remain in position on the sheet or slab and it has a handle 32 for manipulation thereof.

The apparatus described so far would be sufficient for the purpose of carrying out the method according to the invention, and in use, the scale 19 would first be adjusted by means of the screws 21 so that the width between the said scale and the scale 14 corresponds on a reduced scale with the width of the material from which a garment or article is to be made. The scale model patterns are then placed on the sheet or slab 12 and are arranged and re-arranged, starting from the end adjacent to the scale 16 until the best arrangement is found in which the scale models occupy a minimum length of the sheet or slab 12. It will be appreciated that in any such arrangement the model patterns will be predominantly abutting, that is, the majority of individual model patterns will at some point touch one or more of the adjacent model patterns, as shown in Figure 6. If desired, the plate 31 can be placed in position with its left hand edge, as viewed in Figure 1, aligned with calibrations on the scales 14 and 19 corresponding with the length of material to be used. The plate 31, can, however, be subsequently adjusted after the scale models have been arranged, and the length of material required by the particular arrangement can then be read off from either the scale 14 or the scale 19.

The arrangement of the scale models can then be copied in any convenient manner. The preferred method is by using a light sensitive material which is placed face downwards on the top of the models and the surrounding scales 14, 16 and 19 and the plate 31, and then exposing this by a light from above so as to provide a latent image in the sensitive material which will be a reflex image of the arrangement of the models, and when developed will provide a chart similar to that shown in Figure 6, in which the plain areas represent the patterns and the shaded areas the background or waste material.

For convenience in the making of the chart, the end of the base structure beyond the scale 16 is provided with a light tight box 33 to accommodate a roll of printing paper, the box 33 having a slit 34 through which the printing paper can be drawn over the scale models. As more clearly shown in Figures 3 and 4, a clamping bar 35 is mounted on the scale 16, the printing paper is intended to be passed through the slot 34 and beneath the clamping bar 35 and when a sufficient length of the paper has been withdrawn from the box 33, the clamping bar can be tightened down by means of wing nuts 36. The clamping bar 35 also serves to close the slit 34 and prevent entry of light into the box 33. The box 33 is provided with a lid 37 to enable the printing paper to be inserted into the box. Any suitable means may be provided for holding the printing paper flat on top of the models. For example, a sheet of transparent plastics material or a sheet of glass can be placed on top of the printing paper when the latter is in position ready for the exposure.

Instead of reflex printing as described above, the arrangement of the models on the table can be photographed in the normal manner, and the resultant photograph can be used as a chart when arranging full size patterns on the material to be cut out. The reflex printing method, however, is the more convenient, and for this purpose it is preferred that the models shall have white or other light reflecting surfaces and the upper surface of the sheet or slab 12 would then be either black or other dull colour which will not reflect light to the same extent as the models, or vice versa.

In the chart shown in Figure 6, the images of the patterns, some of which are indicated at 40, and also the image 41 of the boundary members are shown white, whilst the background appearing between the patterns is shaded to indicate that this is either black or darker in colour than the patterns. In Figure 5 a typical scale model pattern is shown which is cut from substantially rigid plastics material. Preferably the surfaces of the patterns will be such that markings may be made thereon either by a pencil or a pen or the like, so that such markings will be reproduced on the chart. In Figure 5 the model 18 has a hole 38 for convenience in manipulation, but this hole is not essential and it may be omitted, or it may be replaced by a small knob or a handle. Furthermore, it is preferred that both sides of each model should be alike so that the models will be reversible.

Another method of copying the arrangement of the scale models so as to provide a chart, is to place a sheet of paper, for example tracing paper, over the models and the surrounding scales and then trace the outlines of the models with a pencil. Instead of tracing the outlines with a pencil, the entire surface of the paper can be rubbed over with a crayon or any other convenient solid colouring or marking material. As a further alternative, after the models have been satisfactorily arranged, their upper surfaces can be coated with a suitable colouring material, printing ink would be suitable, and then a sheet of paper placed on top and pressed into contact to receive an impression from the models, this method being the equivalent of printing. The printing ink or the like can be applied by any convenient means, for example by means of an ink carrying roller, and the printing impression can be made by passing a roller over the paper on top of the models. The charts produced by any of these methods could then be used as negatives for photographic reproduction if additional charts are required. The method equivalent to printing would be particularly suitable for use when several copies of the arrangement are required, because the additional copies can be made directly and very quickly.

Although the box 33 is primarily intended to contain light sensitive material, it can also be used to contain a roll of paper when this is required for the alternative chart making methods. If the width of the chart material, whether light sensitive material or paper, is greater than the width required in any particular case, the material will have to be cut to enable it to lie flat on the models and the surrounding scales. For this purpose, a cutter such as that indicated at 42 may be mounted on the bar 20 at the end adjacent to the box 33 so that as the chart material is withdrawn through the slit 34 and over the models it will be trimmed to the required width by the cutter.

In any of the methods described for making the chart from material withdrawn from the box 33, the material can be torn off when required against the outer edge of the clamping bar 35. If desired the edge of the clamping bar can be sharpened to serve as a cutting edge for this purpose.

It will be noted that the sheet or slab 12 has longitudinal and transverse lines 43 and 44 respectively thereon. These lines are provided to facilitate placing models in correct angular positions relatively to the length of the background. For this purpose corresponding markings may be provided on the models or some indication may be provided on some of the models to indicate that one edge of the pattern must be parallel with the length of the material.

In the case of the method being applied to the production of clothing from material having stripes or other patterns, some means will be necessary for indicating suitable locations for some of the models so that when the actual component parts are subsequently cut out, the pattern in one part will match up with the pattern in an adjacent part. In the case of longitudinally striped material, this can be effected by having a piece of substantially transparent material marked with the arrangement of the stripes in the same scale as the models. The length of the transparent member should be equal to the width of the model background so that when one model has been placed in position, the transparent member can be placed over it with one end coinciding with one longitudinal edge of the background and a reference mark on the model can be noted in its relation to the stripe arrangement on the transparent member. Another model which is to have its pattern matching up with that of the first model can then be placed on the background and with the transparent member again placed in position but over the second model and the latter can be adjusted until a reference mark thereon coincides with a similar point of the stripe arrangement as was noted for the first model. For lateral stripes, the procedure will be similar but working from one end of the background instead of the longitudinal edge. In the case of check designs two transparent members may be required, that is regarding the checks as two sets of stripes running longitudinally and laterally respectively. Other patterns can be provided for in a similar manner by having suitable transparent members bearing indications of the patterns on a reduced scale.

What I claim is:
1. A method of making a garment from a number of diversely shaped component parts cut from a length of sheet material sufficient to produce a plurality of said garments, said method comprising the steps of providing a supporting surface representing at a reduced scale the width of the material from which the garment is to be made, arranging on said surface rigid models at the same reduced scale of the component parts of said garment, said models being arranged in predominantly abutting relationship in the smallest rectangular space of a given width into which said model parts will fit without overlapping, reproducing the arrangement of the scale models to provide a chart, arranging full size patterns of said component parts on the sheet material in the same order as shown on the chart, cutting out the material along the lines indicated by the edges of the patterns, and making up the garment from the component parts so cut out.

2. A method of making a chart for use in the manufacture of a garment made from component parts cut out from a length of sheet material sufficient to produce a plurality of said garments, said method comprising the steps of providing a supporting surface representing at a reduced scale the width of the material from which the garment is to be made, arranging on said surface rigid models at the same reduced scale of the component parts of said garment, said models being arranged in predominately abutting relationship in the smallest rectangular space of a given width into which said model parts will fit without overlapping, and reproducing the arrangement of said scale models on an indicia-receiving sheet to provide said chart.

3. A method of making a garment from a number of diversely shaped component parts cut out from a length of sheet material sufficient to produce a plurality of said garments, said method comprising the steps of preparing an individual full size pattern for each component part, preparing a rigid reduced scale model of each pattern, rigidly enclosing on three sides a worksurface having a width representing at the same reduced scale the width of the material from which the garment is to be made, arranging the reduced scale models in predominately abutting relationship on said worksurface to occupy the smallest rectangular portion thereof having the same width into which said parts will fit without overlapping, reproducing this arrangement of the scale models in the form of a chart, arranging the full size patterns on said sheet material in the same order as shown on the chart, cutting out said material along the lines indicated by the edges of the patterns, and making upon the garment from the pieces of material so cut out.

References Cited in the file of this patent

UNITED STATES PATENTS

| | | |
|---|---|---|
| 774,549 | Baese | Nov. 8, 1904 |
| 841,321 | Howard | Jan. 15, 1907 |
| 865,418 | Moe | Sept. 10, 1907 |
| 1,313,496 | Millard | Aug. 19, 1919 |
| 1,563,045 | Schaffer | Nov. 24, 1925 |
| 1,599,069 | Trueb | Sept. 7, 1926 |
| 1,814,390 | Johnson | July 14, 1931 |
| 2,178,933 | Davis | Nov. 7, 1939 |
| 2,236,715 | Kaplan | Apr. 1, 1941 |
| 2,256,894 | Chadkin | Sept. 23, 1941 |
| 2,369,960 | Gage et al. | Feb. 20, 1945 |
| 2,479,609 | Fouch et al. | Aug. 23, 1949 |
| 2,610,413 | Dasey | Sept. 16, 1952 |
| 2,637,039 | Teitelbaum | May 5, 1953 |

FOREIGN PATENTS

| | | |
|---|---|---|
| 739,285 | France | Oct. 25, 1932 |